United States Patent
Booeshaghi et al.

(10) Patent No.: US 6,699,114 B1
(45) Date of Patent: Mar. 2, 2004

(54) PIVOTAL GUARDS FOR POWER HAND TOOLS WITH ROTATING DISCS

(75) Inventors: Farhad Booeshaghi, Tallahassee, FL (US); Charles E. Benedict, Tallahassee, FL (US); Stephen R. Corbett, Tallahassee, FL (US); Christian A. Yates, Tallahassee, FL (US); Mohammad R. Vaghar, Tallahassee, FL (US); Traci K. Campbell, Tallahassee, FL (US)

(73) Assignee: Benedict Engineering Company, Inc., Tallahassee, FL (US)

( * ) Notice: Subject to any disclaimer, the term of this patent is extended or adjusted under 35 U.S.C. 154(b) by 22 days.

(21) Appl. No.: 10/132,263

(22) Filed: Apr. 26, 2002

(51) Int. Cl.⁷ .............................................. B24B 55/04
(52) U.S. Cl. ...................................... 451/451; 451/454
(58) Field of Search ................................ 451/451, 452, 451/453, 454, 455, 457; 83/440.2, 544, 546; 74/608, 609

(56) References Cited

U.S. PATENT DOCUMENTS

| | | | |
|---|---|---|---|
| 2,384,243 A | | 9/1945 | Flohr et al. |
| 3,585,980 A | | 6/1971 | Mellor |
| 3,969,856 A | | 7/1976 | Zerrer |
| 4,330,967 A | | 5/1982 | Richardson |
| 4,343,115 A | | 8/1982 | Stabler et al. |
| 4,711,055 A | | 12/1987 | Mickos |
| 5,005,321 A | * | 4/1991 | Barth et al. .................. 451/359 |
| 5,031,325 A | * | 7/1991 | Walter et al. .................. 30/390 |
| 5,033,192 A | | 7/1991 | Franz et al. |
| 5,140,754 A | * | 8/1992 | Martenson .................... 30/390 |
| 5,709,597 A | * | 1/1998 | Sarantitis .................... 451/456 |
| 6,464,573 B1 | * | 10/2002 | Keller .......................... 451/451 |

FOREIGN PATENT DOCUMENTS

| | | |
|---|---|---|
| CH | 159728 | 1/1933 |
| DE | 3919649 | 12/1990 |
| DE | 3940584 | 6/1991 |

* cited by examiner

Primary Examiner—Dung Van Nguyen
(74) Attorney, Agent, or Firm—Dowell & Dowell, P. C.

(57) ABSTRACT

Guards for covering rotating discs of power hand tools wherein said guard includes a movable guard for covering a normally exposed portion of a disc and which is pivotably mounted relative to a body of the power tool such that the it is movable from a first covering position in a plane substantially parallel to a rotational plane of the disc to a second withdrawn position in which the movable guard extends generally transversely to the rotational plane of the disc thereby allowing maximum disc coverage yet permitting disc use in restricted spaces.

20 Claims, 6 Drawing Sheets

PIVOTAL GUARDS FOR POWER HAND TOOLS WITH ROTATING DISCS

BACKGROUND OF THE INVENTION

1. Field of the Invention

This invention is generally directed to safety guards for use with power hand tools and especially those such as rotary grinders and sanders incorporating a rotating disc. More particularly, the present invention is directed to movable guards which are pivotable relative to a rotating disc of a power hand tool for purposes of providing a safety barrier to prevent injury, both by accidental contact with the rotating disc and also due to debris being thrown beyond the disc.

2. Brief Description of the Related Art

Heretofore there have been many innovations made with respect to providing safety guards for use with hand held power tools which incorporate rotating mechanisms such as sanders, edgers, planars, grinders and the like. Generally, such guards fall into one of two categories. The first type of guard is designed to protectively cover at least a portion of either side of a rotating tool, such as a sander or grinder, such that the guard has opposite sidewalls which extend in parallel relationship with respect to one another on either side of a segment of the disc. The guards are mounted to enclose a portion of the tool disc but must leave a portion of the disc exposed for allowing an edge of the disc to engage a work surface. With some such guards, the guard housing is fixed, however, in others, the guard housing may include a segment which can be pivotable about an axis which is generally parallel to a rotational axis of the disc thereby allowing the guard to move by engagement with a surface, so as to pivot away from the surface and expose an edge portion of the disc.

Some examples of the first type of guard are disclosed in U.S. Pat. Nos. 2,384,243 to Flohr et al., 3,969,856 to Zerrer, 3,585,980 to Mellor, 4,711,055 to Mickos, 5,033,192 to Franz and 5,140,754 to Martenson.

Of the foregoing safety devices, each is designed to be mounted so as to at least partially enclose a rotating disc such that a section of an edge of the disc may be used to engage a work surface. In each of these patents, it is generally the radial edge of the disc which is the working portion of the tool.

In U.S. Pat. Nos. 3,585,980 and 5,033,192, the protective guards or hoods are generally designed to be fixed relative to the rotating tool and provide exit or exhaust openings for guiding material to an appropriate collection device. The guards with respect to these mechanisms are not designed to completely cover the working surface of the tool, and thus, a portion of the tool surface can be accidentally engaged.

In U.S. Pat. No. 5,140,754, the guard is designed to be pivoted about the rotational axis of the tool. Again, it is generally the radial edge of the tool which is the working component of the tool, and even though the guard may be pivoted to allow different portions of the tool surface to be covered, the surface of the tool remains partially unprotected during tool use. A similar operating characteristic is found in U.S. Pat. No. 3,969,856.

In U.S. Pat. Nos. 2,384,243 and 4,711,055, the guards provide a complete enclosure for the rotating disc. Portions of the enclosure are movable or pivotable about a central pivot axis in the event the guard engages a work surface. With these structures, the rotating disc remains within the confines of the guard until the guard engages a surface at which time the guard pivots to allow exposure of a radial edge of the disc. Unfortunately, such guards only find use in specific type of tools wherein the radial edge of the tool is the only working surface of the tool.

A second type of protective guard for rotating tools of the hand held type includes a guard shield which extends in a plane which is generally perpendicular to an elongated axis of a tool body so as to be interposed in a plane parallel to the operating plane of the working tool and the operator or a hand grip of the tool. Such shielding guards normally are somewhat fixed structures which cover only a segment or portion of the rotating disc, leaving a separate section of the disc uncovered. These types of guards or shields are more appropriately used for grinders and sanders wherein a planar face of the grinder or sander, as well as a radial edge of the tool, may be used on a work surface. Examples of these types of guards are disclosed in U.S. Pat. No. 4,330,967 to Richardson and German Patent DE 3940584A1.

Unfortunately, there remains a need to provide better protective guards or shields for use with hand held rotary tools of the type which have a working surface which may be a planar surface or a radial edge of the tool, such as the case with many grinders and rotary sanders. Further, there remains a need to provide such guards which will, in many working positions of the tool, provide an effectively complete cover or shield between the tool and an operator and yet which will pivot to enable the tool to be used in hard to reach areas which might otherwise be prohibited, if the guard or shield remain fixed relative to the tool during its operation.

SUMMARY OF THE INVENTION

The present invention is directed to a pivotable guard assembly which may be used in conjunction with conventional fixed guards or may be incorporated with a fixed guard segment in order to provide as much shielding protection to a tool operator as is possible when using a powered rotating tool, such as a power sander or power grinder. The invention incorporates a collar or mounting sleeve which can be mounted along a front portion of a body of a hand held power tool and secured thereto and to which is pivotably mounted a guard or shield member. In preferred embodiments, the guard or shield member is designed to extend, when in a first position, generally parallel to a rotating disc of the tool so as to provide a barrier over at least substantially half of the disc. The pivotable guard or shield has an outer portion extending beyond the radial edge of the disc and an inner portion which is contoured so as to allow pivotable movement of the guard or the shield relative to the front portion of the body of the power tool without interference therewith. In this respect, the inner edge of the guard or shield will generally be somewhat concavely configured to permit adequate clearance so that the guard can be pivoted from its first position, in covering relationship with respect to the tool disc, to a second fully withdrawn position, wherein the guard or shield extends generally perpendicular to a plane of rotation of the disc.

In a preferred embodiment, the pivotal guard is made of a transparent material to allow the operator to view the working tool therethrough to better control the use of the tool when working on a surface.

Also, in preferred embodiments, the manner in which the pivotal guard or shield is mounted to the mounting collar is such as to provide a resilient return of the pivotal guard or shield to its first fully covering position. In this manner, the pivotal guard will be automatically pivoted away from the working disc when the pivotal guard engages a surface which would otherwise block the disc from reaching a work surface to thereof allow contact of the disc with the work surface. This is particularly the case when the disc must be used in corner areas. As the disc approaches a corner, the guard or shield will be pivoted toward the second position but will resiliently return to its first covering position in the event the tool is moved away from the closely confining space or area in which the tool is being used, thus providing maximum safety and coverage for the working disc which allows access to restricted work areas.

In another embodiment of the invention, a second generally fixed guard or shield may be mounted directly to the tool body or to the mounting collar by way of which the pivotal guard or shield is connected to the work tool.

In yet another embodiment of the invention, the guard of the present invention may include a first generally fixed section and a second pivotal section which is pivotally mounted relative to the first section such that the fixed and pivotal sections fully cover a rotating disc when in a first position generally parallel relative to a rotary place of the working disc. A pivot attachment between the pivotal guard section and the fixed may be such that the pivotal guard section is directly connected to the fixed guard section such as by resilient hinges which permit the pivotal section to move from the first parallel covering position toward and to a fully withdrawn position generally perpendicular to the working or rotary plane of a disc. The hinges automatically return the pivotal guard section to the fully covering or first position as soon as the tool is removed from a restricted work space. In some embodiments, both the fixed and the pivotal guard sections may be transparent and in some embodiments, one or more of the guard sections may include outwardly extending flanges for providing further protection along the rachet edge portion of a disc.

Also, in some embodiments, a friction locking mechanism may be provided so as to normally retain the pivotal section of the guard or shield in its first position until sufficient pressure is applied to pivot the guard away from its fully covering position. Such friction retention devices will provide added safety by ensuring that the mere movement of the tool by the operator will not cause a pivotal movement of the shield until the shield engages a surface which is obstructing the use of the tool and which surface contact will in effect provide the necessary force to overcome the friction lock and cause the pivotal movement of the pivotal section of the guard assembly.

It is a primary object of the present invention to provide a safety guard or shield for use with hand held rotary power tools, such as power grinders and power sanders, wherein the guard includes at least one pivotable component which is generally resiliently loaded to maintain the guard section in a fully covering position in a plane extending generally parallel to a tool disc and between a plane of the disc and the handle of the tool but which is pivotal away to allow the tool disc to engage hard to reach areas so that the guard shield does not provide an obstruction prohibiting the normal use of the disc of the power tool.

It is yet a further object of the present invention to provide a safety guard or shield for use with power grinders and power sanders, as well as other power tools having rotary discs wherein at least a portion of the guard or shield is transparent so as to allow an operator to view the working tool and a work surface therethrough.

BRIEF DESCRIPTION OF THE DRAWINGS

A better understanding of the invention will be had with respect to the attached drawings wherein.

DESCRIPTION OF THE PREFERRED EMBODIMENTS

Figure 1:
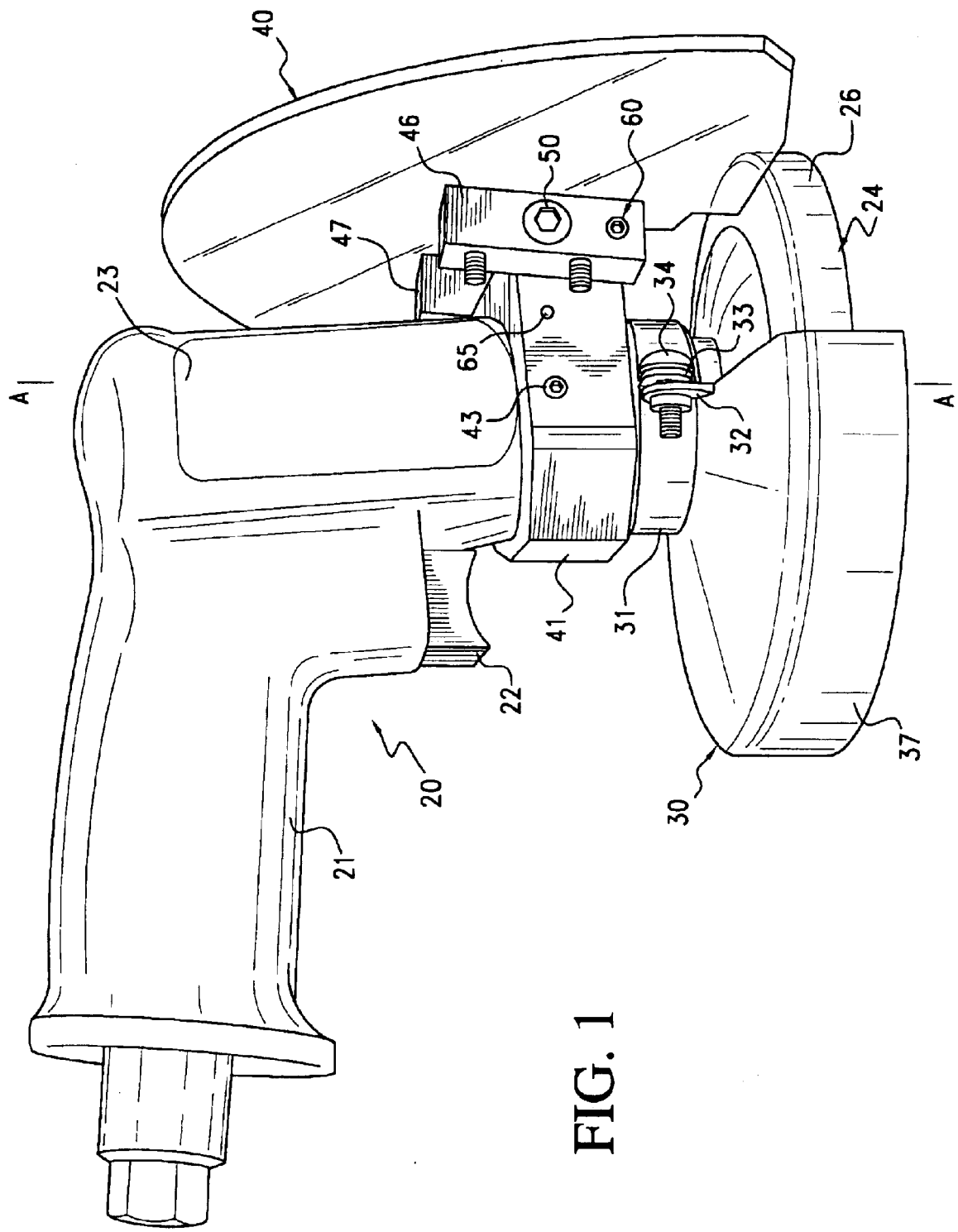
FIG. 1 is a perspective illustrational view of the invention showing the guard attached to a hand held power grinder with a pivotal section of the guard shown in a fully withdrawn or retracted position permitting the use of the power tool in hard to reach areas.

With continued reference to the drawing figures, a power tool 20 of the hand held type is shown having a pistol grip handle 21, an operating on/off trigger 22, a main body 23 and a rotating tool disc 24. The tool disc rotates about an axis "A—A" as shown in FIG. 1. The power tool may be any type, such as a rotary grinder or sander. The tool disc generally has a planar working front face 25 and a radial working annular edge 26.

Figure 2:
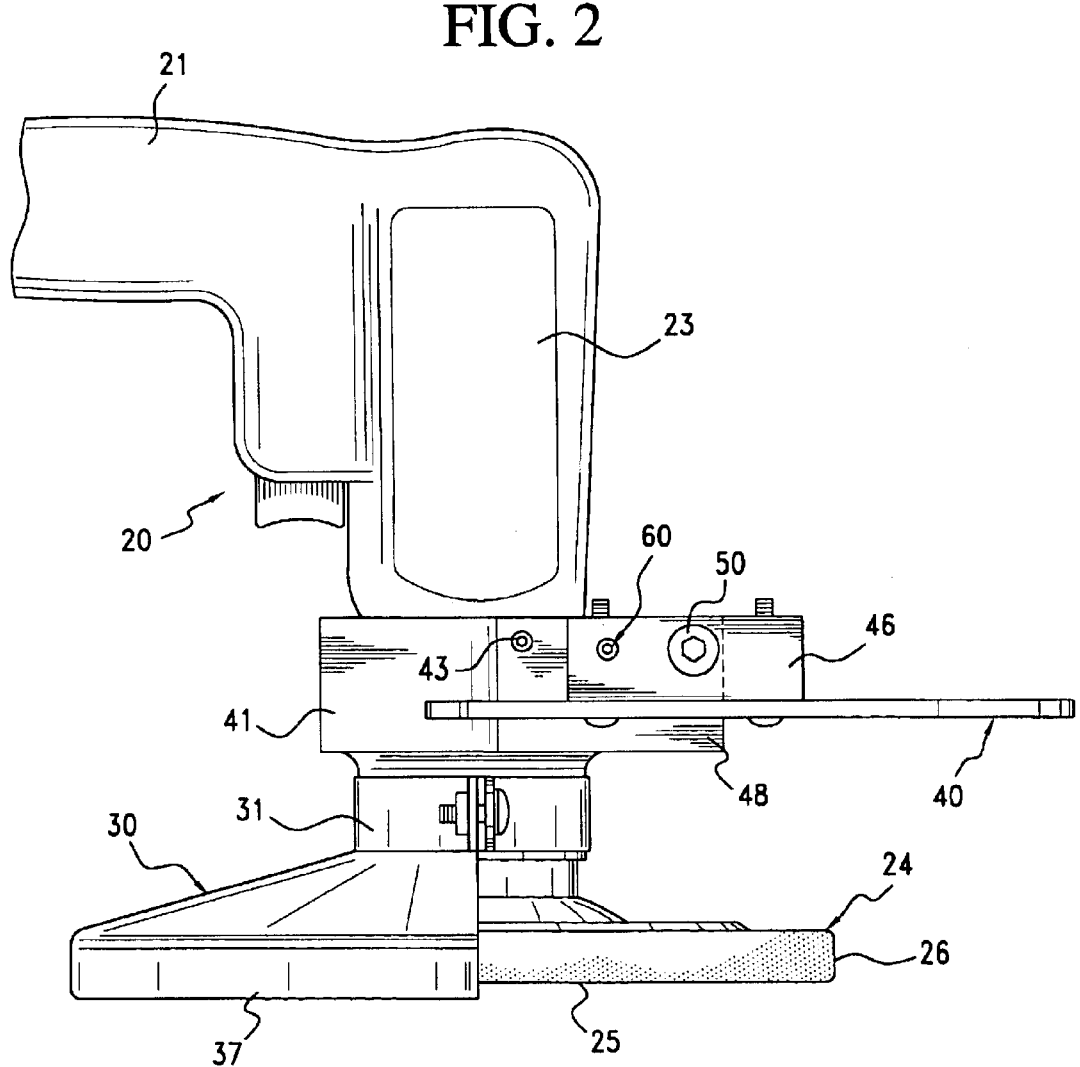
FIG. 2 is an elevational view of the embodiment as shown in FIG. 1.
Figure 3:
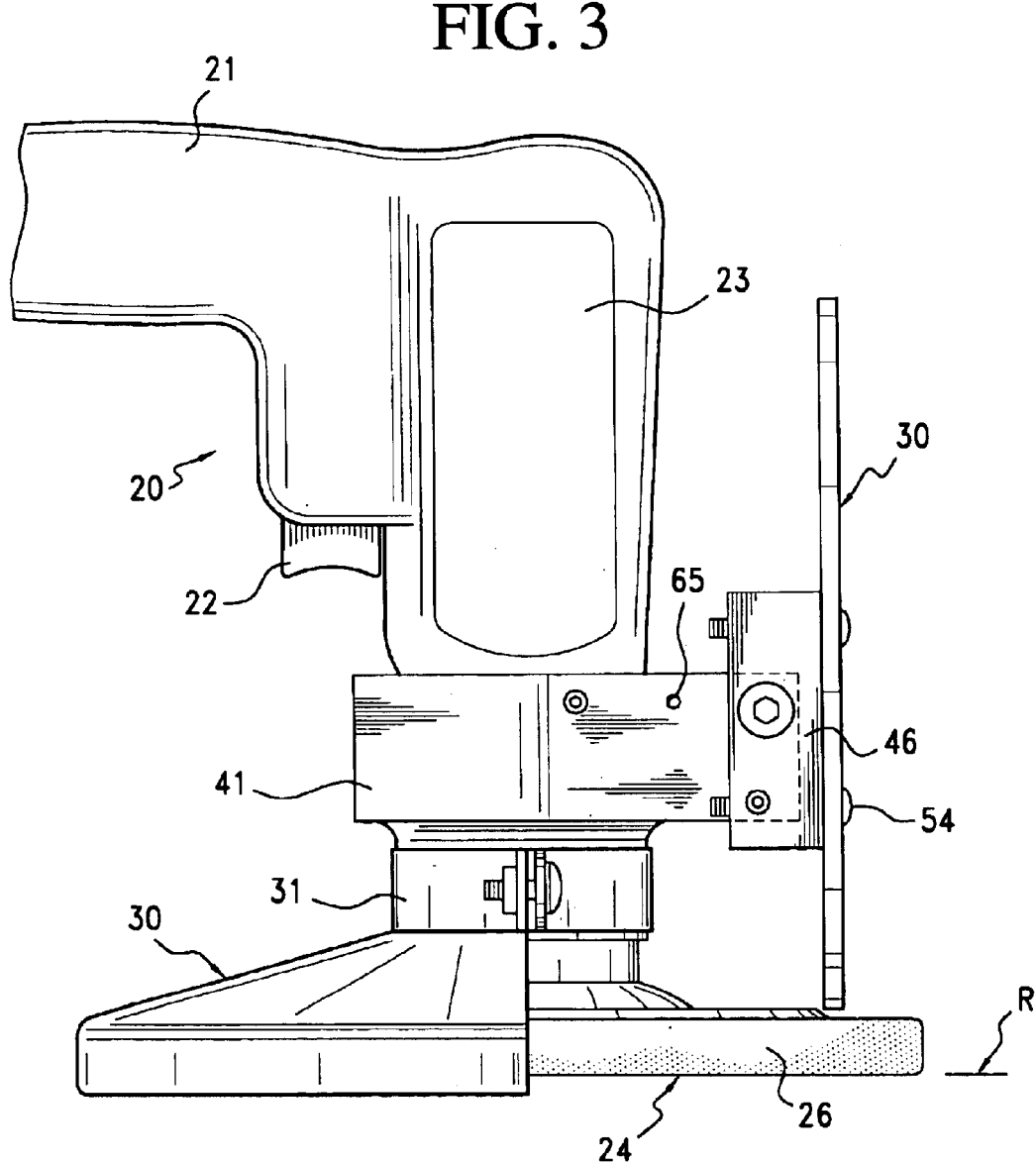
FIG. 3 is an elevational view similar to FIG. 2 but showing the pivotal guard section pivoted to a first fully covering relationship with respect to the rotating disc of the power tool.

As shown in FIGS. 1–3, in some conventional tools, a partial fixed guard 30 is provided which extends over approximately half of the rotating disc. Such conventional guards are generally mounted to the body of the power tool utilizing a collar or clamp 31 having opposing flanges 32 and 33 which are secured by appropriate fasteners such as a screw 34. The clamp is mounted directly to a forward portion of the body of the tool such that the guard 30 is disposed generally parallel between the disc and the pistol grip or operating portion of the power tool. In this position, the conventional fixed guard 30 covers a portion of the disc to prevent contact over approximately half of the working portion of the disc and to prevent debris from being thrown back toward the operator. However, with such conventional guards, a substantial portion of the disc remains unprotected. The conventional guards are generally formed of a metallic material and may include a lip portion 37 for extending along a peripheral edge of the disc.

In accordance with a first embodiment of the present invention, a second pivotal or movable guard or shield 40 is shown as being pivotally mounted to a collar or sleeve 41. The collar generally surrounds the forward portion of the power tool just rearwardly of the position at which the clamp for the fixed guard is mounted. The collar may include separate sections or may include a single piece which is cast, hollowed or bored to provide an appropriate seat. The collar or sleeve is secured in place using a plurality of set screws 43, or other securing devices, such that the collar or sleeve will not move relative to the tool body when in use.

Figure 7:
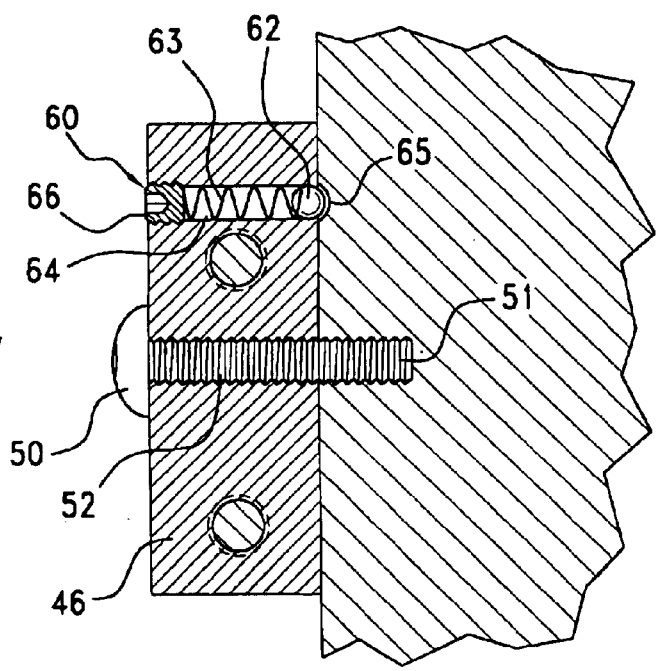
FIG. 7 is an enlarged cross-sectional view taken along line 7—7 of FIG. 4.

In the embodiment of FIGS. 1–3, a pair of pivot blocks 46 and 47 are mounted to opposite sides of an extension portion 48 of the mounting collar or sleeve. Mounting is accomplished by pivot pins 50 which are threadingly engaged, such as shown at 51, to the collar but which permit the pivot blocks to be freely rotatable with respect thereto, as shown in FIG. 7. Coil springs 52 are provided about the shaft of the pivot pins, also as shown in FIG. 7, normally urging the pivot blocks to the position shown in FIG. 3 of the drawings. The pivotal guard or shield is secured by adhesive or by suitable mechanical fasteners such as screws 54, to the two pivot blocks such that the shield is securely retained to the blocks and moves therewith about the pivot pins.

As shown in FIG. 7, in order to retain the pivotal guard or shield in a first covering relationship with respect to a portion of the disc which is not covered by the conventional guard 30, a friction locking mechanism 60 is provided. Although various types of locking mechanisms can be utilized, one example is shown in FIG. 7 wherein a detent 65 is provided in at least one outer surface of the extension portion 48 of the sleeve in which a detent ball 62 is normally seated when the pivotal guard is in a position as shown in FIG. 3. A spring 63 is mounted within a passageway 64 formed in the pivot block 46 and the sleeve is retained in position by a set screw 66. In this manner, the detent ball will normally be seated within the detent and retain the pivots blocks in the position shown in FIG. 3 under normal operating conditions. A similar lock may be used with pivot block 47. The amount of locking force can be adjusted by adjusting the set screw associated therewith.

In the event the pivotal or movable guard 40 engages a surface, the pivotal guard can pivot about the pivot pins 50 when the force supplied to the guard is sufficient to urge the locking balls from the detents, thus permitting the movable guard to freely rotate with the pivot blocks such that the guard moves to a fully retracted or second position, as is shown in FIGS. 1 and 3, transverse to the rotational plane "R" of the disc. As shown, the movable guard is generally perpendicular to the plane "R" in FIG. 3. In this position, the disc of the tool may be free to work in areas which would be hard to reach and could not be reached with the movable guard in its first or covered position, as shown in FIG. 3 wherein the movable guard is generally parallel to the rotational plane "R" of the disc.

Due to the spring mounting of the pivot blocks relative to the collar, as soon as the obstruction is removed relative to the pivotal guard or shield, the guard will automatically return to the first position shown in FIG. 2 under the force of the springs 52, thus ensuring optimum coverage of the tool disc during operating conditions.

To permit the relative rotation of the pivotal guard relative to the tool disc and to the collar, an inner edge 70 of the pivotal guard is cut out as shown at 72 and may include a series of angular cuts as shown at 73 and 74. These somewhat concave cuts provide clearance for the guard adjacent to the extension portion of the collar when in the first covering position as shown in FIG. 3. The clearance provided by the cut out portion is further exemplified or detailed in FIG. 5 which shows the pivotal guard in its fully retracted or second position.

Figure 4:
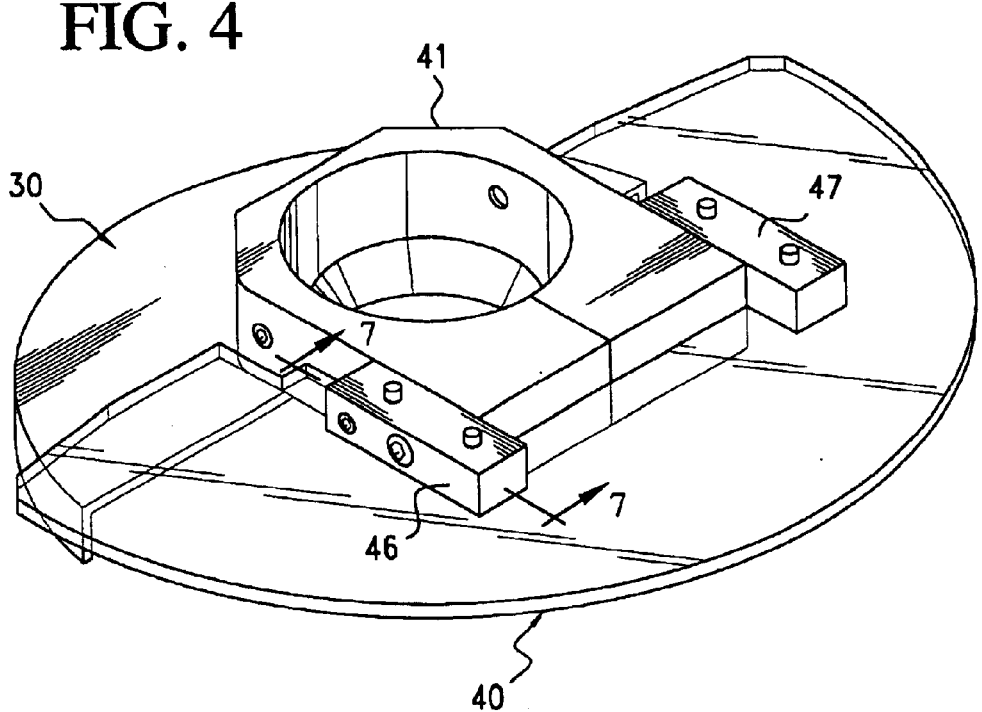
FIG. 4 is a top perspective view of a second embodiment of guard in accordance with the teachings of the present invention.
Figure 5:
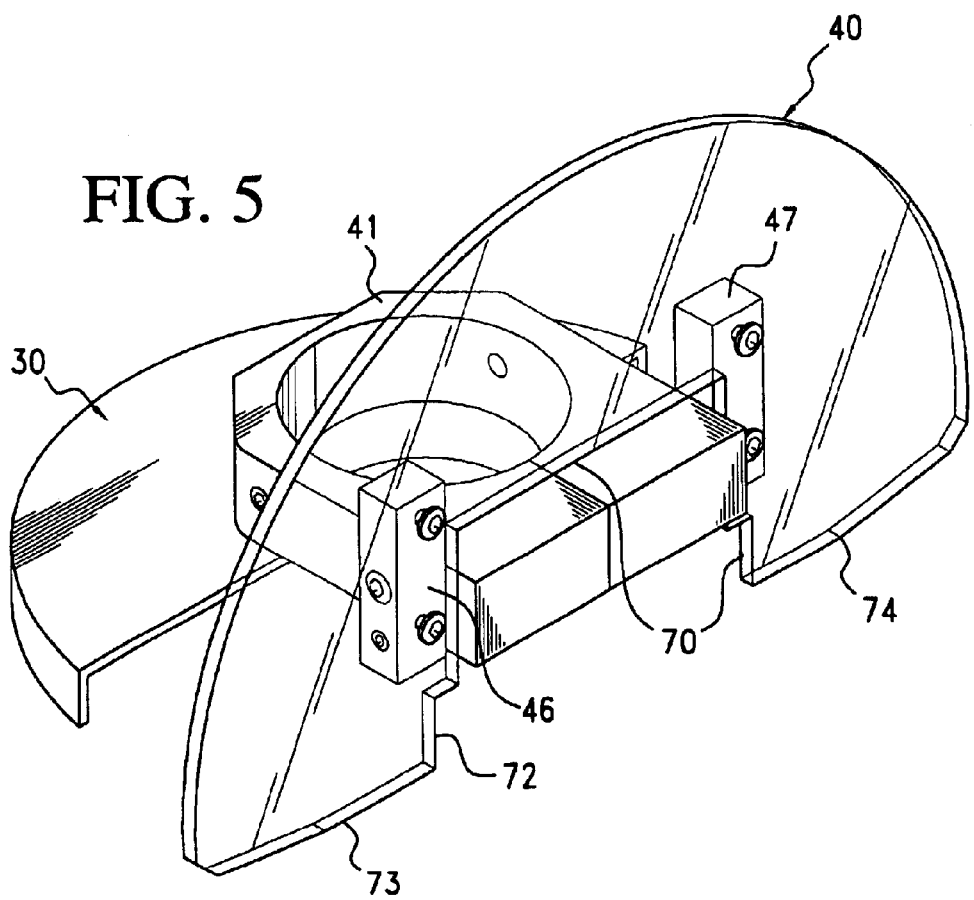
FIG. 5 is a view similar to FIG. 4 except showing a pivotal section of the guard raised or pivoted to a second non-obstructing position.
Figure 6:
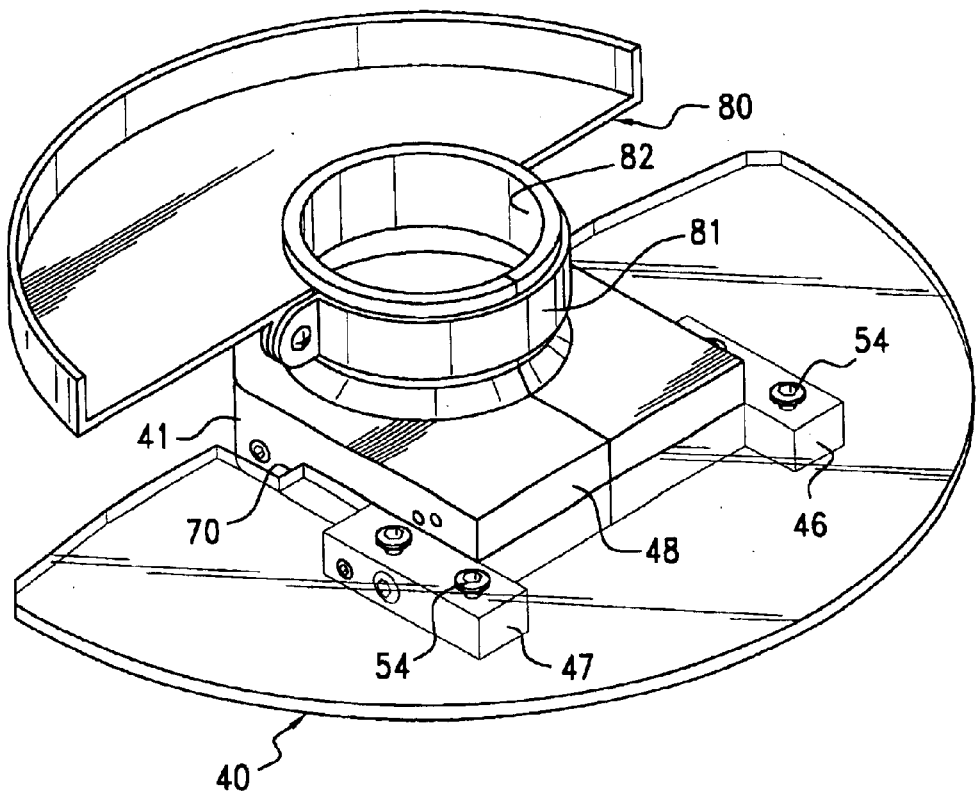
FIG. 6 is a bottom perspective view of the embodiment shown in FIG. 4.

With respect to FIGS. 4–6, a second embodiment of the invention is disclosed wherein the invention includes both a fixed guard component 80, which is similar in structure to the conventional guard segment 30, and a pivotal guard section 40, which is similar to the pivotal guard section of the previous embodiment. The manner in which the pivotal guard section 40 is pivotally mounted to the collar 41 is identical to that as disclosed with respect to the previous embodiment. However, in this embodiment, the fixed guard 80 can be attached directly to the collar or sleeve 82, similar to sleeve 41, and thus does not require a separate mounting clamp, as is disclosed with respect to the conventional fixed guards 30, as shown in the embodiment of FIGS. 1–3.

In both of the embodiments of FIGS. 1–3 and 4–6, the pivotal or movable guard component is preferably constructed of a transparent material such as a heavy duty plastic so that an operator may view a work surface and the power tool disc through the guard or shield. This is important not only to allow the operator to know the relative position of the pivotal guard and the working tool but also to allow the operator to view the effect of the working disc on a work surface. In some embodiments, the stationary or fixed guard segment 80 may also be transparent.

In both of the embodiments previously described, it should be noted that the pivotal guard component is shown as a generally flat or planar component. It should be noted that the outer edge of this member may include a flange or lip similar to that formed on the outer edge of the conventional guard 30, shown at 37. Further, the pivotal guard or shield extends outwardly a distance beyond the radial annular work edge of the rotary disc of the power tool.

Figure 8:
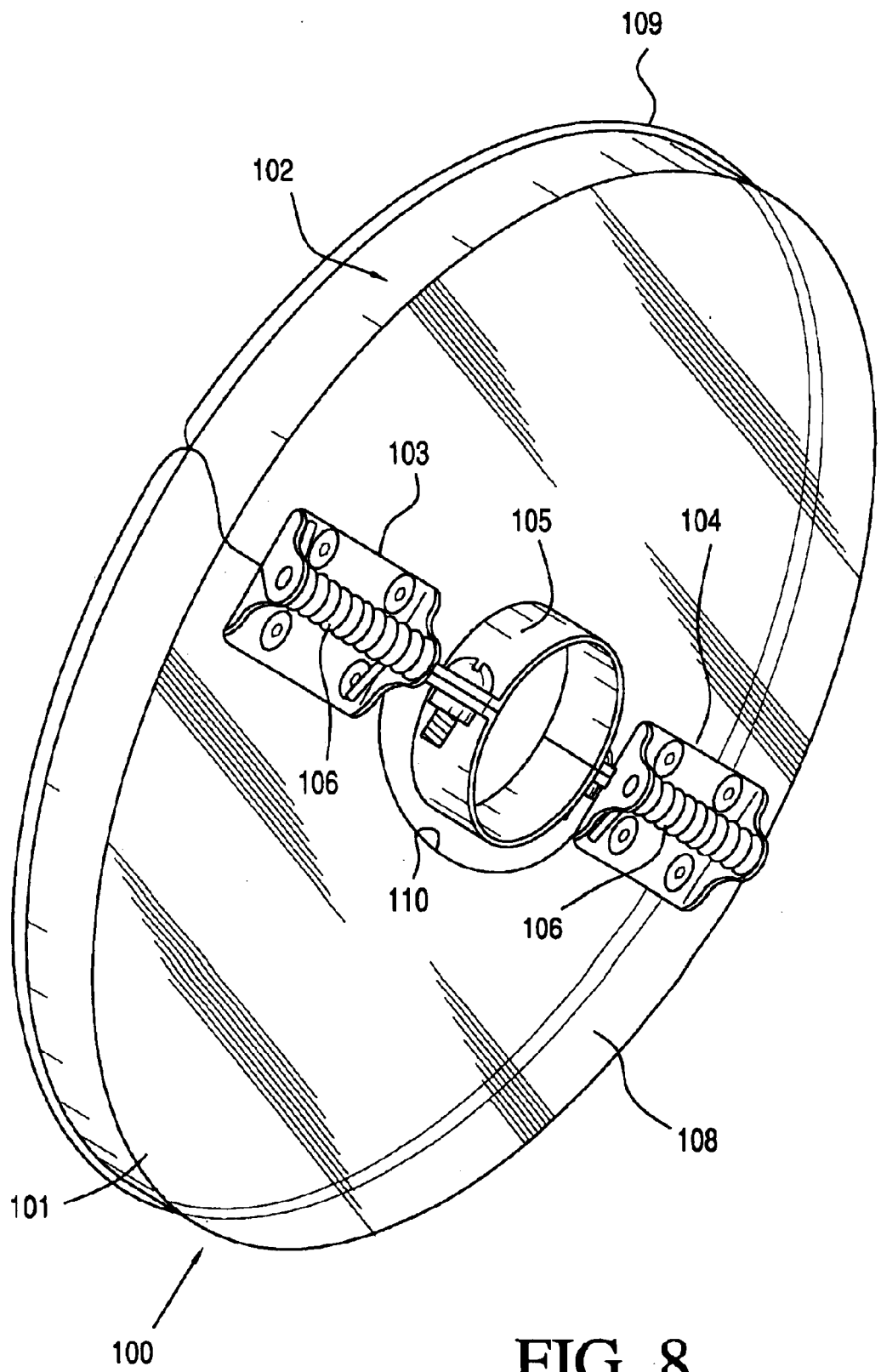
FIG. 8 is a perspective view of a further embodiment of the present invention.

With respect to FIG. 8, a further embodiment of the invention is shown in greater detail. In this embodiment, the guard 100 includes a pivotal section 101 which is connected to a fixed or stationary section 102 by way of a pair of spring hinges 103 and 104. A central mounting collar 105 is connected to the fixed guard or shield section and includes a locking member, such as a screw, for clamping the collar to a portion of a power tool in a manner similar to the manner in which conventional fixed guards are mounted and as shown in FIGS. 1–3. In this embodiment, the hinges are shown incorporating springs 106 which are designed to force or urge the pivotal guard section 101 to the position shown in FIG. 8, which is the first covering position of the pivotal guard. When the pivotal guard engages an obstruction, it can be pivoted against the action of the springs and pivot outwardly to a second position generally perpendicular with respect to a rotational plane "R" of the tool disc, in a manner similar to that described and shown with respect to the embodiment of FIGS. 1 and 3. As soon as any obstructed force is removed, the pivotal guard section will be allowed to return the position shown in FIG. 8 by action of the springs associated with the hinges.

In this embodiment, both the fixed and the pivotal guard segments are made of transparent plastic material. Further, a cut out 110 of generally concave shape is provided in the pivotal guard segment for purposes of providing clearance for the guard segment relative to the mounting collar 105. Further, in this embodiment, each of the fixed and the pivotal guard sections is provided with an outer flange or lip 108 and 109, which extends outwardly beyond the annular edge of the working disc, thus providing further safety for the operator of the power tool.

In the use of the various embodiments of the present invention, the mounting collar or sleeve is first positioned on the body of the power tool and mechanically secured in position. In those embodiments where a conventional fixed guard is used, the fixed guard must be removed before placing the collar or sleeve into position unless a split collar or sleeve is used. In some embodiments, although not shown in the drawings, the collars or sleeves may be used as split sleeves which may be secured in half sections to one another and clamped to the body of the tool.

With the collars in place, the fixed guard and the pivotal guard will ensure a complete barrier or shield between the working disc and the operator, as is shown in FIG. 2. In the event an obstruction is encountered, the pivotal guard section will be forced from its first covering position, as shown in FIG. 2, to a fully retracted position, as shown in FIGS. 1 and 3, thereby permitting the working disc to function in restricted areas. Due to the resilient mounting of the pivotal guard or shield, once the power tool is removed from the obstructed area, the pivotal guard or shield will be automatically returned to its fully covering position to provide maximum safety for the operator.

In addition to the foregoing, as previously discussed, in some embodiments, a separate locking means, such as a friction detent lock, or other lock, can be utilized to secure the pivotal shield in its first covering position such that the shield can not be accidentally moved away from the disc of the power tool by operator movement of the tool but can only be moved when an obstruction is encountered.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A method of providing protection by way of a guard covering a portion of a rotary disc of a hand held power tool wherein the power tool includes a body from which extends a rotating disc, the method comprising:
   a) providing a movable guard,
   b) providing a mounting member for securing the movable guard relative to the body of the power tool;
   c) pivotally mounting the movable guard relative to the mounting member so as to be movable from a first position extending generally parallel to a rotational plane of the rotating disc and intermediate the rotating disc and the body of the power tool to a second position wherein the movable guard extends transverse to the rotational plane of the rotating disc; and
   d) resiliently urging the movable guard toward the first position.

2. The method of claim 1 including the additional step of frictionally retaining the movable guard in the first position.

3. A guard apparatus for use with a hand held rotary power tool having a body from which extends a rotating disc, the apparatus including, a movable guard, mounting means for mounting the movable guard to the body of the tool, pivot means for pivotally mounting the movable guard relative to said mounting means so as to be movable from a first covering position adjacent the rotating disc and extending generally parallel to a rotational plane of the rotating disc to a second retracted position extending transversely with respect to the rotational plane of the rotating disc, and resilient means for resiliently urging said movable guard toward said first position.

4. The apparatus of claim 3 including a fixed guard, and second mounting means for mounting said fixed guard in covering relationship intermediate the rotating disc of the power tool and the body thereof such that said fixed guard extends between a first portion of the rotating disc and the body of the tool and the movable guard extends between a second portion of the rotating disc and the body of the power tool.

5. The apparatus of claim 4 in which said pivot means includes pivot assemblies for securing said movable guard to said mounting means, each of said pivot assemblies including a resilient means including a spring mounted for pivotally urging said movable guard toward said first position.

6. The apparatus of claim 4 including a friction lock for normally retaining said movable guard in said first position.

7. The apparatus of claim 3 wherein said movable guard is formed of a transparent material.

8. The apparatus of claim 3 including a fixed guard, extending intermediate a portion of the rotating disc of the power tool and the body thereof such that said fixed guard and said movable guard extend between separate portions of the rotating disc and the body of the power tool.

9. The apparatus of claim 8 in which said fixed guard is mounted to said mounting means.

10. The apparatus of claim 9 including means for urging said movable guard toward said first position.

11. The apparatus of claim 10 in which each of said fixed guard and said movable guard have outer extending flanges for covering an outer peripheral edge of the rotating disc of the power tool.

12. The apparatus of claim 8 in which said fixed guard is mounted to said mounting means and said movable guard is pivotally mounted to said fixed guard.

13. The apparatus of claim 12 in which said movable guard has an inner edge cut out to provide a clearance for said movable guard relative to said mounting means.

14. The apparatus of claim 3 in which said movable guard has an inner edge cut out to provide a clearance for said movable guard relative to said mounting means.

15. The apparatus of claim 3 including means for continuously urging said movable guard to said first position.

16. An apparatus for providing a guard for a hand held power tool having a body and a rotating disc, the apparatus comprising, a guard including a movable guard section and a fixed guard section, mounting means for mounting said fixed guard section to the body of the tool such that said movable guard section and fixed guard section extend outwardly between the rotating disc and the body of the power tool, pivot means for pivotally connecting said movable guard section to said fixed guard section whereby said movable guard section is movable from a first position extending generally parallel to a rotational plane of the rotating disc of the power tool to a second position extending transversely thereto, and urging means for resiliently urging the movable guard section toward said first position.

17. The apparatus of claim 16 in which said movable guard section has an inner edge having a cut out to provide a clearance for said movable guard section relative to said mounting means.

18. The apparatus of claim 17 in which said pivot means for pivotally mounting includes at least one hinge member mounted on said fixed guard section and said movable guard section.

19. The apparatus of claim 18 in which said movable guard section is transparent.

20. The apparatus of claim 19 in which said fixed guard section is transparent.

* * * * *